US012566562B2

(12) United States Patent
Jogwadikar et al.

(10) Patent No.: US 12,566,562 B2
(45) Date of Patent: Mar. 3, 2026

(54) DATA STREAM FILE SYSTEM

(71) Applicant: NetScout Systems, Inc., Westford, MA (US)

(72) Inventors: Sapana Jogwadikar, Pune (IN); Ruchira Naik, Pune (IN); Sayali Jadhav, Pune (IN); Mahesh Rajmane, Pune (IN)

(73) Assignee: NetScout Systems, Inc., Westford, MA (US)

( * ) Notice: Subject to any disclaimer, the term of this patent is extended or adjusted under 35 U.S.C. 154(b) by 114 days.

(21) Appl. No.: 18/604,012

(22) Filed: Mar. 13, 2024

(65) Prior Publication Data

US 2025/0123763 A1     Apr. 17, 2025

(30) Foreign Application Priority Data

Oct. 17, 2023    (IN) .............................. 202341070400

(51) Int. Cl.
G06F 3/06            (2006.01)

(52) U.S. Cl.
CPC ............ G06F 3/064 (2013.01); G06F 3/0643 (2013.01)

(58) Field of Classification Search
CPC ....... G06F 3/064; G06F 3/0643; G06F 3/0673
See application file for complete search history.

(56) References Cited

U.S. PATENT DOCUMENTS

| | | | |
|---|---|---|---|
| 2017/0285975 A1* | 10/2017 | Trika ..................... | G06F 3/0659 |
| 2019/0082002 A1* | 3/2019 | Huang .................... | H04L 67/06 |
| 2022/0094738 A1* | 3/2022 | Zhang ................. | H04L 67/1097 |
| 2023/0176743 A1* | 6/2023 | Dalmatov ............. | G06F 3/0679 |
| | | | 711/102 |
| 2023/0297516 A1* | 9/2023 | Duval ................... | G06F 3/0673 |
| | | | 711/3 |
| 2023/0359382 A1* | 11/2023 | Pan ....................... | G06F 3/0644 |
| 2023/0409200 A1* | 12/2023 | Gao ...................... | G06F 3/0608 |

* cited by examiner

*Primary Examiner* — Francisco A Grullon
(74) *Attorney, Agent, or Firm* — Foley & Lardner LLP

(57) ABSTRACT

A method is disclosed. In the method, a set of data blocks can be stored. A continuous stream of data can be received. First data from the continuous stream of data can be stored in a first subset of data blocks. Second data from the continuous stream of data can be stored in a second subset of data blocks. Responsive to determining each of the set of data blocks is filled with data, data in a third subset of data blocks can be overwritten with data from the continuous stream of data.

20 Claims, 7 Drawing Sheets

400

Initialize a number of data blocks in memory
402

Receive a continuous stream of data
404

Store the data in a data block
406

Determine data block is full
408

Last data block?
410

N

Y

Identify subsequent data block
412

Identify initial block
416

Store data in subsequent data block
414

Overwrite data in initial block
418

Time interval ended?
420

N

Y

Increment time interval
422

500

DATA STREAM FILE SYSTEM

CROSS-REFERENCE TO RELATED APPLICATIONS

This application claims the benefit of priority to Indian Provisional Application No. 102341070400, filed Oct. 17, 2023, the entirety of which is incorporated by reference herein.

BACKGROUND

General-purpose file systems such as XFS and ext4 are designed to accommodate a wide range of use cases, including file creation, modification, updating, and deletion. However, this versatility can lead to performance issues due to fragmentation and scattered file data on the disk.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
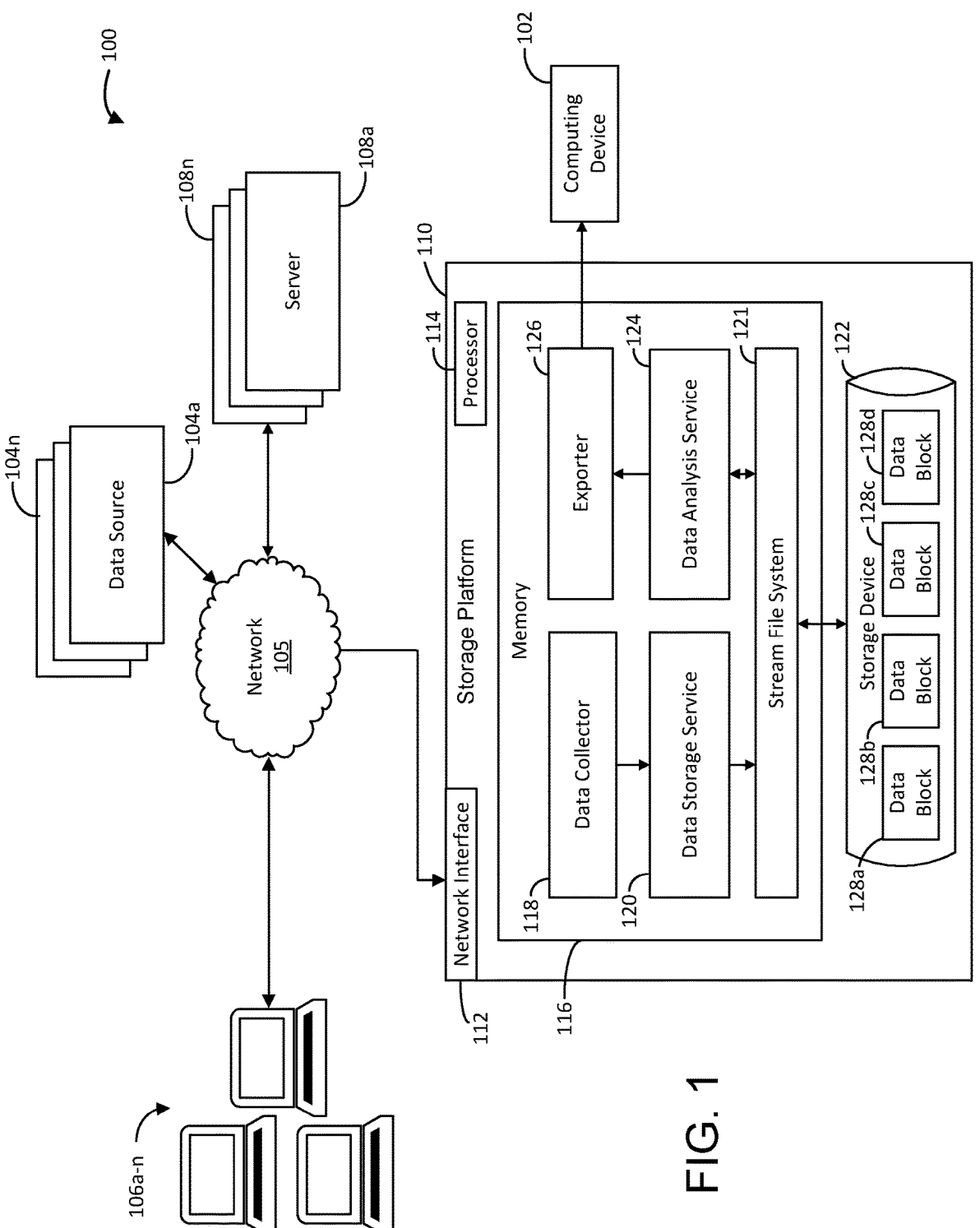
FIG. 1 is an illustration of a data stream storage system, in accordance with an implementation.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

As mentioned above, conventional data storage systems, such as XFS and ext4, may have difficulties processing streams of data in real-time. For example, file types such as adaptive service intelligence (ASI) tables, sessions, flows, etc., may use an XFS filesystem for recording to disk. However, XFS has its limitations in terms of disk fragmentation and aging.

In the case of streaming data, there may not be a need for frequent modifications or updates. The data of data streams may be written once and never modified. In some cases, the data may be deleted based on time, with older data being removed to make space for new data. An example of a data stream is a recording from a surveillance camera, such as a camera used in closed-circuit television (CCTV) systems. Video data from CCTV systems may be continuously recorded without any modifications. Older recordings may be automatically deleted as new data is recorded. If specific footage is required for evidentiary purposes, it is necessary to back up the data within a given time frame. Other examples of this type of data management include logging data in files or databases, packet recording, video streaming, etc. However, data storage systems that store such data may have performance issues due to fragmentation and scattered file data on the disk.

A computer implementing the systems and methods described herein may overcome the aforementioned technical deficiencies. For example, the computer may store multiple data blocks in memory (e.g., on-disk memory). Each data block may be allocated a defined amount of memory for data storage. The computer may receive a continuous stream of data and store the data in the data blocks in real time. The computer may store the data in the data blocks in a circular order, thus reducing the "disk-seek" overhead. In some embodiments, the computer can receive multiple streams of data and store the streams of data in the data blocks simultaneously. Files can be stored chronologically based on creation time. This design inherently aligns the data blocks of various files, having similar time intervals, to be close to each other on the disk. The design helps reduce disk seeks considerably when reading and/or writing files. Such a filesystem design may be particularly beneficial in cases in which data is collected at a high rate and needs to be stored in a time-sorted order.

For example, a computer may store a plurality or a set of data blocks in memory (e.g., on-disk memory). The data blocks may each have an equal size, as configured by an administrator. The computer may receive a continuous stream of data (e.g., audiovisual data or a stream of data packets of communication sessions across a communications network) from a data source. As the computer receives the continuous stream of data, the computer may sequentially fill up individual data blocks of the set of data blocks. For example, the computer can fill an initial first data block as the computer receives the stream of data and then begin filling a second data block responsive to determining the first data block is full. The computer can store the continuous stream of data in this manner over time until each of the plurality or set of data blocks is full. Responsive to determining each of the data blocks is filled with data, the computer can overwrite the data in the initial first data block with received data from the data stream. The computer can repeat this circular data storage process over time to ensure the most recently received or stored data (which may be the most relevant or likely to be retrieved data) is stored in memory for retrieval.

The computer can store the continuous stream of data in the data blocks in separate files. Each file can include one or more data blocks. The computer can store data for individual files for defined time intervals. For example, the computer can store data from the continuous stream of data from the data source as described above for a first time interval. In doing so, the computer can store the data in a first subset of data blocks that correspond with a first file. Responsive to determining the end of the first time interval, the computer can store data from the stream of data in a second subset of data blocks that correspond with a second file. The computer can separate the data blocks of the different files by storing a separate data structure (e.g., a record) for each file that includes identifications of the individual data blocks that store data for the respective files. Any number of data blocks of the plurality of set of data blocks can correspond to individual files. The computer can store data of any number of files of the continuous stream of data in the data blocks.

In storing different files in the data blocks, the computer can account for the circular nature of the data storage technique described herein. For example, the computer may determine the last data block of the plurality or set of data blocks is full prior to an end of a time interval of data storage for a file. Responsive to doing so, the computer may return to the initial data block and continue the storage process by overwriting any data stored in the initial data block and further data blocks during the time interval. In doing so, the computer can store an identification of the initial data block and the further data blocks in the same data structure as the last data block of the set or plurality of data blocks, in some cases removing an identification of the initial data block and/or any further blocks from a data structure for another file in the process.

The system architecture described herein has multiple advantages over conventional data storage systems. Examples of such advantages can include (i) if the disk is near-full, files with the oldest creation time may be automatically overwritten, thus giving a feel of endless storage space; (ii) implementing the system architecture can ensure that there will not be any holes or fragmentation in data. Data may be aged out in a first-in-first-out fashion; (iii) implementing the system reduces or eliminates the overhead of looking up free data blocks during real-time data storage; (iv) optimal disk head movement ensures maximum input/ output write performance; and (v) files can be written once and read multiple times. Once a file is closed, the file can never be appended or modified again, in some embodiments. Since data written to disk cannot be modified, the data cannot be tampered with, thus improving or ensuring data security. The system architecture can be used for many data streaming applications, and the files can be used as evidence.

FIG. 1 illustrates an example data stream storage system 100 for storing streams of data in real time, in some embodiments. The system 100 may provide improved real-time data storage of continuous streams of data. In brief overview, the system 100 can include client devices 106*a-n* (hereinafter client device 106 or client devices 106) that exchange data packets with servers 108*a-n* (hereinafter server 108 or servers 108) over a network, such as in communication sessions. The servers 108 can each include a set of one or more servers 502, depicted in FIG. 5A, or a data center 508. The system 100 can also include a storage platform 110. The storage platform 110 can communicate or interface with the network 105, such as to intercept the data packets transmitted between the client devices 106 and the servers 108, and/or a computing device 102. The storage platform 110 can communicate with the computing device 102 over the network 105. The storage platform 110 can receive a continuous stream of data (e.g., a stream of data packets of different communication sessions) transmitted over the network 105. The storage platform 110 can store the data packets in separate data blocks in memory. The storage platform 110 can store the data packets in the data blocks in a circular fashion, filling up each data block in memory until returning to the initial data block and overwriting the initially stored data in the data blocks. In this way, the storage platform 110 can store the data for efficient and fast retrieval while ensuring the most recently received data is available for retrieval and/or processing.

The client devices 106, the servers 108, the computing device 102, and/or the storage platform 110 can include or execute on one or more processors or computing devices (e.g., the computing device 503 depicted in FIG. 5C) and/or communicate via the network 105. The network 105 can include computer networks such as the Internet, local, wide, metro, or other area networks, intranets, satellite networks, and other communication networks such as voice or data mobile telephone networks. The network 105 can be or include a 5G network. The network 105 can be used to access information resources such as web pages, web sites, domain names, or uniform resource locators that can be presented, output, rendered, or displayed on at least one computing device (e.g., client device 106), such as a laptop, desktop, tablet, personal digital assistant, smart phone, portable computers, or speaker. For example, via the network 105, the client devices 106 can communicate with the servers of the servers 108. In some embodiments, the network 105 may be or include a self-organizing network that implements a machine learning model to automatically adjust connections and configurations of network elements of network 105 to optimize network connections (e.g., minimize latency, reduce dropped calls, increase data rate, increase quality of service, etc.).

Each of the computing device 102, the client devices 106, the servers 108, and/or the storage platform 110 can include or utilize at least one processing unit or other logic device such as a programmable logic array engine, or module configured to communicate with one another or other resources or databases. The components of the computing device 102, the client devices 106, the servers 108, and/or the storage platform 110 can be separate components or a single component. The system 100 and its components can include hardware elements, such as one or more processors, logic devices, or circuits.

Still referring to FIG. 1, and in further detail, the system 100 can include the servers 108. The servers 108 may each be or include servers or computers configured to transmit or provide services across the network 105 to the client devices 106. The servers 108 may transmit or provide such services upon receiving requests for the services from any of the client devices 106. The term "service" as used herein includes the supplying or providing of information over a network, and is also referred to as a communications network service. Examples of services include 5G broadband services, any voice, data, or video service provided over a network, smart-grid network, digital telephone service, cellular service, Internet protocol television (IPTV), etc.

As the servers 108 provide or transmit data in communication sessions to client devices 106 and/or between each other, the storage platform 110 may intercept or otherwise monitor the data packets that the servers 108 transmit between each other and between the client devices 106. The storage platform 110 may receive such data and store the data on disk for further processing.

In some embodiments, the system 100 can include one or more data sources 104*a-n* (hereinafter data sources 104 or data source 104). The data sources 104 can be or include any type of data source that provides data to the storage platform 110. In one example, the data sources 104 can include one or more closed circuit television (CCTV) surveillance cameras or video recorders. The CCTV cameras or video recorders can capture video of an area over time and stream the captured video to the storage platform 110 as the CCTV cameras or video recorders capture the video. Other examples of data sources 104 that can provide a continuous stream of data to the storage platform 110 include audio sensors, motion detectors, infrared and thermal sensors, access control systems, vibration sensors, radio frequency identification systems, environmental sensors, face recognition systems, license plate recognition systems, weather stations, point-of-sale (POS) systems, Internet-of-Things devices, public announcement systems, biometric systems, traffic flow systems, drones, and social media feeds. The data sources 104 can separately generate and transmit continuous streams of data to the storage platform 110 for storage.

The storage platform 110 may comprise one or more processors that are configured to receive streams of data and store the data in different data blocks. The storage platform 110 may comprise a network interface 112, a processor 114, memory 116, and/or a storage device 122. The storage platform 110 may communicate with any of the computing device 102, the data sources 104, the client devices 106, and/or the servers 108 via the network interface 112. The processor 114 may be or include an ASIC, one or more FPGAs, a DSP, circuits containing one or more processing components, circuitry for supporting a microprocessor, a group of processing components, or other suitable electronic processing components. In some embodiments, the processor 114 may execute computer code or modules (e.g., executable code, object code, source code, script code, machine code, etc.) stored in the memory 116 to facilitate the operations described herein. The memory 116 may be any volatile or non-volatile computer-readable storage medium capable of storing data or computer code. The storage device 122 can be disk storage (e.g., a hard disk drive or a solid state drive) or non-volatile memory of the storage platform 110.

The memory 116 may include a data collector 118, a data storage service 120, a stream file system 121, a data analysis service 124, and an exporter 126, in some embodiments. The stream file system 121 may store and retrieve data from data blocks in the storage device 122. In brief overview, the components 118-126 may receive continuous streams of data from one or more of the data sources 104 and/or as data packets of communication sessions between the client devices 106 and the servers 108. The components 118-126 may store the collected data in different data blocks over time as the data is collected. The components 118-126 can store data from the continuous streams of data in sequential data blocks until storing the data in each of the data blocks stored in the storage device 122. Responsive to determining each data block is full or that the last data block is full, the components 118-126 may return to the initial data block in the storage device 122 and repeat the process, overwriting the initially stored data in the same order of data blocks. The components 118-126 can repeat this process over time, in some cases concurrently with different continuous data streams from the different data sources 104 and/or communication sessions. In this way, the components 118-126 may store relevant data in data blocks in close proximity to each other and ensure that the most recently stored data remains available for further processing.

The data collector 118 may comprise programmable instructions that, upon execution, cause the processor 114 to receive or collect data (e.g., data packets) from one or more of the data sources 104 and/or from communication sessions between the client devices 106 and the servers 108. The data collector 118 may be or include an application programming interface (API). The data collector 118 may collect data from the data sources 104, such as by communicating with any APIs stored by the data sources 104 or by receiving the data through various ports of the storage platform 110 that connect the storage platform 110 with the data sources 104. The data sources 104 may transmit data to the storage platform 110 in respective continuous streams of data. Upon receiving such data, the data collector 118 may transmit the data to the data storage service 120 for further processing.

The data collector 118 can collect data from communication sessions between the client devices 106 and the server 108. For example, the data collector 118 may collect control plane signaling data at an Evolved/Next-Generation Packet Core interface (e.g., the S11-interface or the N4 interface) of the network 105. The data collector 118 may also be connected to a core interface (e.g., an S1-U logical interface) of the network 105 to collect user plane data. The data collector 118 may receive and correlate the user plane and control plane traffic. The data collector 118 can store such data for different communication sessions between the client devices 106 and the servers 108. The data packets of each communication session may correspond to a different continuous stream of data. The data collector 118 may transmit the continuous stream of data for each communication session to the data storage service 120 for further processing. As described herein, the individual communication sessions (e.g., the devices communicating in the communication sessions, together or separately) may be data sources 104 themselves.

The data collector 118 may concurrently collect one or multiple continuous streams of data. For example, the data collector 118 may only collect one feed from a CCTV camera (e.g., a data source 104) in a continuous stream of data without collecting data from any other sources. In another example, the data collector 118 may collect continuous streams of data from different CCTV cameras (e.g., data sources 104) at once. The different CCTV cameras may be recording different views of the same area or different portions of the same building, for example. The data collector 118 may collect data from different CCTV cameras when the storage platform 110 is operating within a local area network, for example. In another example, the data collector 118 can collect a stream of audio data separate from a stream of video data for a video stream. The data collector 118 can concurrently collect continuous streams of data from any number of data sources 104, in addition to or instead of the continuous streams of data that the data collector 118 collects from communication sessions between the client devices 106 and the servers 108.

The data storage service 120 may comprise programmable instructions that, upon execution, cause the processor 114 to manage the stream file system 121 to store data in the data blocks 122. In some embodiments, the data storage service 120 may be or include a network appliance in case of network deep packet inspection data (e.g., control plane signaling data or data plane data) or a service that is configured to process any other type of data. The data storage service 120 may receive the data from the data collector 118 over time as the data collector 118 collects data (e.g., collects one or more continuous streams of data). The data storage service 120 may receive the data and forward or transmit the data to the stream file system 121.

The stream file system 121 may comprise programmable instructions that, upon execution, cause the processor 114 to insert data into data blocks 128a-d (hereinafter data blocks 128 or data block 128) of the storage device 122 as the stream file system 121 receives the data. One or more actions performed by the stream file system 121 may be performed by the data storage service 120, and/or vice versa, in some embodiments. The data blocks 128 may be or include dedicated areas of the storage device 122 (e.g., on-disk memory, such as in non-volatile storage) of the storage platform 110. The data blocks 128 may be stored on a hard disk drive or a solid-state drive, for example. Each of the data blocks 128 may be accessible to both the data storage service 120 and the data analysis service 124 through the stream file system 121. Data stored in the data blocks 128 may be unmodifiable (e.g., cannot be changed or deleted). The data blocks 128 may each have an equal size or capacity. The size of the data blocks 128 can be configured during the initialization or creation of the data blocks 128, for example.

The stream file system 121 may store data of a continuous data stream in the data blocks 128 over time. For example, the stream file system 121 can receive a continuous data stream (e.g., a continuous stream of data) from the data storage service 120 that the data storage service 120 receives from a data source 104. The stream file system 121 can receive the continuous data stream over time. As or while the stream file system 121 receives the continuous data stream, the stream file system 121 can store the data of the continuous data stream in individual data blocks 128 in the storage device 122. For instance, the stream file system 121 can store data from the continuous data stream in an initial data block 128 as the stream file system 121 receives the continuous data stream. The initial data block 128 can be a first data block. The stream file system 121 can continue to store the data from the continuous data stream in the initial data block 128 until reaching a limit or capacity of the initial data block 128.

Responsive to determining the limit or capacity of the initial data block 128 has been reached, the stream file system 121 can identify a second data block 128 or a subsequent data block 128. The stream file system 121 can identify the second data block 128 responsive to determining the second data block 128 is sequentially after the initial data block 128 (e.g., the initial data block 128 may be first data block of a sequence of adjacent data blocks 128 in the storage device 122, so the stream file system 121 can identify the second data block 128 responsive to determining the second data block 128 is next in the sequence). Responsive to identifying the second data block 128, the stream file system 121 can store data from the continuous data stream in the second data block 128. The stream file system 121 can store data from the continuous data stream in the second data block 128 until the second data block 128 fills up or reaches capacity. Responsive to determining the second data block has filled up, the stream file system 121 can identify a third data block 128 based on the third data block 128 being next in the sequence of data blocks 128 after the second data block 128. The stream file system 121 can repeat this process to store data from the continuous data stream in any number of data blocks 128. In storing the data in different data blocks 128, the stream file system 121 can store timestamps indicating when the stream file system 121 began storing data in the respective data block 128 and/or finished or stopped storing data in the respective data blocks 128. Sequential data blocks may be close or adjacent to each other (e.g., there may not be a data block between sequential data blocks) in the storage device 122.

The stream file system 121 can sequentially store data from the continuous data stream in the data blocks 128 until determining that the last data block 128 of the storage device

122 has been filled to capacity. Responsive to determining that the last data block 128 has been filled to capacity, the stream file system 121 can identify the initial data block 128. Responsive to identifying the initial data block 128, the stream file system 121 can store data from the continuous stream of data in the initial data block 128. However, the initial data block 128 may already have previously stored data, such as from the same continuous stream of data, and the stored data may not be modified (e.g., changed or deleted). Accordingly, when receiving the newly received data from the continuous stream of data, the stream file system 121 may store the data in the initial data block 128 by overwriting (e.g., automatically overwriting without any user input) the previously stored data in the initial data block 128 with the new data from the continuous data stream.

The stream file system 121 may overwrite the data in the initial data block 128 until overwriting the data with new data from the continuous data stream to the maximum capacity of the initial data block 128. Responsive to overwriting the data in the initial data block 128 with new data to the maximum capacity of the initial data block 128, the stream file system 121 can identify the second data block 128 and overwrite the data in the second data block 128 with data from the continuous stream of data. The data storage service can overwrite the data in the second data block 128 until reaching a maximum capacity of the second data block 128, at which point the stream file system 121 can identify the next sequential data block and overwrite data in the next sequential data block 128. The stream file system 121 can repeat this process for each of the data blocks 128 until overwriting all of the data in the data blocks 128 with new data from the continuous stream of data. Responsive to determining each data block is overwritten, the stream file system 121 can return again to the initial data block 128 and repeat the process. The stream file system 121 can repeat this process for any number of cycles as the stream file system 121 receives the continuous stream of data.

In some embodiments, the data storage service 120 can divide the data of a continuous stream of data into separate files. Each file can correspond to or include the data of one or more of the data blocks 128. The data storage service 120 can be configured to divide the continuous stream of data based on the time intervals in which the data storage service 120 receives the continuous stream of data. For example, to divide the data into files, the data storage service 120 can store a data structure (e.g., a database) with different records (e.g., a list or table) that each correspond to a different file. Each record can include an identification (e.g., a numerical or alphanumerical value) of the file of the record and one or more identifications (e.g., numerical or alphanumerical values) of the data blocks in which data for the file is stored. As the stream file system 121 stores data in data blocks for different files, the data storage service 120 can update the records of the files to indicate the data blocks in which data is stored for the respective files.

For example, the data storage service 120 may be configured to indicate storage of data in different files for defined time intervals. Each time interval can correspond to a different file. The data storage service 120 may maintain and increment a clock over time. Using the clock, the data storage service 120 can determine when the respective time intervals and the next respective time intervals begin. The stream file system 121 can store data in the data blocks 128 during the time intervals. The data storage service 120 can add identifications of the data blocks in which data is stored to the records for the files corresponding to the time intervals in which the stream file system 121 stores the data. Accordingly, the data storage service 120 can use the clock to determine the records in which to store identifications of data blocks to separate the data blocks into different files that can later be queried.

In one example, the stream file system 121 can begin storing data from a continuous data stream in the data blocks 128 (e.g., beginning with the initial data block 128, or the first data block). The data storage service 120 can instantiate the clock or a timer to begin a first time interval. The stream file system 121 can store the data in different sequential data blocks 128 as the data blocks are filled to capacity over the course of the first time interval. In doing so, the stream file system 121 can store the data in a first subset of data blocks 128. The first subset of data blocks 128 can make up or include data of a first file. The data storage service 120 can update a record (e.g., a first record) for the first file to include an identification of each data block in the first subset of data blocks 128. The data storage service 120 can compare the timer or clock to the first time interval over the course of the first time interval (e.g., for each increment of the timer or clock). Responsive to determining the first time interval has ended, the data storage service 120 can determine a second time interval has begun. The stream file system 121 can continue storing data from the continuous data stream in the data blocks 128 as described above during the second time interval. In doing so, the stream file system 121 can store the data in a second subset of data blocks 128. The second subset of data blocks 128 can make up or include data of a second file. The data storage service 120 can update a record (e.g., a second record) for the second file to include an identification of each data block in the second subset of data blocks 128. The data storage service 120 can compare the timer or clock to the second time interval over the course of the second time interval (e.g., for each increment of the timer or clock). Responsive to determining the second time interval has ended, the data storage service 120 can determine a third time interval has begun and begin storing data for a third file. The data storage service 120 and the stream file system 121 can continue operating in this manner for any number of time intervals to store any number of files of data.

In some cases, the stream file system 121 can store data in data blocks 128 in the last data block 128 of the data blocks 128 and the initial data block 128 of the data blocks 128. For example, during the second data time interval, the stream file system 121 may store data in data blocks 128 up to and including the last data block 128. Accordingly, the last data block 128 may be filled and the second time interval may not be over. The stream file system 121 may return to the initial data block 128 of the data blocks 128, and continue storing data for the second file in the initial data block 128, such as by overwriting the previously stored data in the initial data block 128. The data storage service 120 can continue to store data in the data blocks 128 subsequent to the initial data block 128 in a third subset of data blocks 128 for the duration of the second time interval. The data storage service 120 can store an identification for the last data block 128, the initial data block 128, and/or the third subset of data blocks 128 in the record for the second file. The process can continue in this way for any number of time intervals. Accordingly, the data storage service 120 may replace aged data in the data blocks 128 with new data over time, ensuring the stored data is not stale and the most recently generated data is available for retrieval and/or processing.

When overwriting data blocks 128 with new data, the data storage service 120 can replace the identifications of the data blocks 128 being overwritten in the data structure containing records for different files. For example, when overwriting the initial data block 128 for a second file, the data storage service 120 may remove any data block identification that was previously in a record for the initial data block 128 and write a new data block identification in the record for the second file. In some embodiments, the data storage service 120 may do so responsive to determining the data block 128 is full, such as to ensure accuracy of the identifications of the data blocks in the records for the files. Accordingly, the data of the second file may be accurately indexed.

In some embodiments, the stream file system 121 may store data in files based on a file size capacity in addition to or instead of based on time intervals. For example, the data storage service 120 can store a file size capacity in memory 116. As stream file system 121 stores data in the data blocks 128 as described herein, the data storage service 121 can determine the amount of data that the stream file system 121 is storing. The data storage service 120 can compare the amount of stored data to the file size capacity until determining the file size capacity has been reached. Responsive to determining the file size capacity has been reached, the data storage service 120 can begin storing data in a second file by storing identifications of the data blocks in a different record in the data structure of records. The data storage service 120 can store any number of files in this way.

In some embodiments, the stream file system 121 may begin overwriting data blocks 128 responsive to determining conditions are satisfied other than determining the last data block 128 is filled with data. For example, the stream file system 121 may store a maximum file limit. The maximum file limit can be configured during the initialization of the data blocks 128. The stream file system 121 can maintain a counter of the number of files for which the stream file system 121 is currently storing data. The stream file system 121 can increment the counter for each new file for which the stream file system 121 stores data. The stream file system 121 can compare the count of the counter to a threshold (e.g., a predetermined threshold). Responsive to determining the count exceeds or otherwise satisfies the threshold, the stream file system 121 can identify the data block 128 that corresponds with the earliest time stamp and begin overwriting the identified data block 128. In doing so, the stream file system 121 can store data for the new file. The stream file system 121 can continue performing the systems and methods described herein to store data in the data blocks 128 when overwriting the identified data block 128 for the new file. The stream file system 121 can overwrite the data of the block with the earliest time stamp even when there is free disk space or there are other blocks that are available to store data without any overwriting. The stream file system 121 can decrement the counter responsive to overwriting all of the data for a particular file.

In some embodiments, the data storage service 120 can age out old files of data stored in the data blocks 128. For example, the data storage service 120 can determine differences in time between the current time and the time intervals in which files are created. The data storage service 120 can determine when such a difference exceeds a threshold (e.g., a predetermined threshold). Responsive to doing so, the data storage service 120 can begin overwriting the initial data block 128 of the file associated with the difference as described herein. For instance, responsive to detecting an end of the second time interval, the data storage service 120 can store data for a third time interval (e.g., store third data from the continuous stream of data in a fourth subset of the set of data blocks for a third time interval). The data storage service 120 can determine a time difference between a current time and the first time interval (e.g., a defined point of the first time interval, such as the beginning, middle, or end of the first time interval) exceeds a threshold. Responsive to determining that the time difference exceeds the threshold, the data storage service 120 can overwrite (e.g., begin to overwrite) the data in the data blocks 128 of the first time interval with newly collected data from the continuous stream of data, thus aging out old files.

The stream file system 121 can store data from multiple continuous streams of data (e.g., from separate data sources 104) in the data blocks 128. The stream file system 121 can store the data from the continuous streams of data concurrently with each other. The stream file system 121 can do so by storing the data from the separate continuous streams of data for separate files and/or in separate data blocks 128. For example, the stream file system 121 can receive data from a first continuous stream of data during a first time interval. The stream file system 121 can concurrently receive data from a second continuous stream of data during the first time interval. The stream file system 121 can store the data from the first continuous stream of data beginning with the initial data block 128 of the data blocks 128 and, concurrently, store data from the second continuous stream of data in the data block 128 sequentially after the initial data block 128. The stream file system 121 can identify the data block 128 that fills up first (e.g., the different streams of data may contain data of different densities, which may cause the streams of data to fill up the data blocks at different speeds). Responsive to determining one of the data blocks 128 is full, the stream file system 121 can identify the third sequential data block 128 and begin filling the third sequential data block 128 with data from the continuous stream of data that initially filled the first data block 128. The stream file system 121 can repeat this process any number of times for the two continuous data streams following the systems and methods described herein, overwriting data blocks 128 as necessary for continuous storage. The stream file system 121 can store data for any number of continuous streams of data.

The data storage service 120 can store data for separate files for different continuous data streams. For example, as the stream file system 121 stores data for different data streams in different data blocks 128, the data storage service 120 can store identifications of data blocks in which the data is stored in records for that each correspond to a different file for a respective continuous data stream. In doing so, the data storage service 120 can use the same time intervals to differentiate the records such that the data storage service 120 generates and/or begins storing data for a different file for each continuous data stream.

The data analysis service 124 may comprise programmable instructions that, upon execution, cause the processor 114 to perform analytics on the data stored in the data blocks 128. The data analysis service 124 may query and/or retrieve (e.g., through the stream file system 121) data from the data blocks 128 that the stream file system 121 stored in the data blocks 128. In some embodiments, the data analysis service 124 queries one or more data blocks 128 to retrieve data for a specific file. The data analysis service 124 can query the data block 128 in any manner. The data analysis service 124 may retrieve the data and process the data using one or more functions to generate KPIs and/or alerts. The data analysis service 124 may retrieve data from one data block 128 after the stream file system 121 stores data in the data block 128 and while the stream file system 121 stores data in another data block 128.

Examples of KPIs include, but are not limited to, latency, number of connections, quality of the connections, volume of data transmitted, average connection time, cell PRB (physical resources blocks), resources consumed, etc. Other examples of KPIs may be related to connection quality such as min/max/average/mean and distribution of connection mean opinion score (MOS), connection drops, retransmissions, etc. An example of an alert may be an alert of a security breach. The data analysis service 124 may generate the KPIs or alerts for individual communication sessions, geographical areas in which individual nodes that are communicating and receiving data across the network 105 are located, types of devices, etc.

In some embodiments, the data analysis service 124 processes data in the data blocks 128 in response to receiving a request. For example, the data analysis service 124 can receive a request from the computing device 102. The request can include an identification of a file and, in some cases, an identification of a continuous data stream, for which data is stored in the data blocks 128. The data analysis service 124 can identify the identification of the file from the request and identify a record containing a matching identification for the file (e.g., identify the record for the file). The data analysis service 124 or the stream file system 121 can identify data blocks 128 that contain data for the file from the record for the file in the data structure. The data analysis service 124 can retrieve (e.g., through the stream file system 121) data from the identified data blocks 128 responsive to identifying the data blocks 128. The data analysis service 124 can transmit the retrieved data to the computing device 102, in some embodiments after any requested processing of the data (e.g., after determining KPIs from the retrieved data). The data analysis service 124 can perform such processing while the stream file system 121 continues to store data received from the data storage service 120.

The exporter 126 may be or comprise executable instructions that, upon execution by the processor 114, may export generated KPIs or alerts and/or corresponding data to the computing device 102 (e.g., an external computer). For example, the exporter 134 may create an exportable record (e.g., a file, document, table, listing, message, notification, etc.) or file (e.g., a file with a format such as BIL, GRD/TAB, PNG, ASKII, KMZ, etc.) from the data or generated KPIs and/or alerts retrieved or generated by the data analysis service 124 from the data blocks 128 and transmit the exportable file to the computing device 102 for display. The exporter 134 may transmit the exportable file to the computing device 102, in some cases responsive to a request from the computing device 102. In some embodiments, the data analysis service 124 and/or the exporter 134 may generate and/or export KPIs and/or alerts to the computing device 102 at set intervals to provide the computing device 102 with real-time updates of the performance communication sessions between nodes or real-time CCTV video data.

Advantageously, by implementing the systems and methods described herein, a computer can store data in a time-sorted order. Such applications typically prioritize the latest data, while older data may be removed based on storage availability or security considerations. In one example, the computer may implement the systems and methods described herein in a surveillance system. The computer can enable time-sorted storage, where older data is automatically aged out or deleted. As a result, the entire file system can function as a high-performance "First-In-First-Out" (FIFO) storage system. The computer can continuously write files in a sequential manner based on their timestamps, creating the illusion of unlimited storage capacity as older files are automatically removed. The systems and methods described herein may be useful for applications that require a FIFO data storage approach, such as surveillance systems, packet recordings, and flow recordings.

Figure 2:
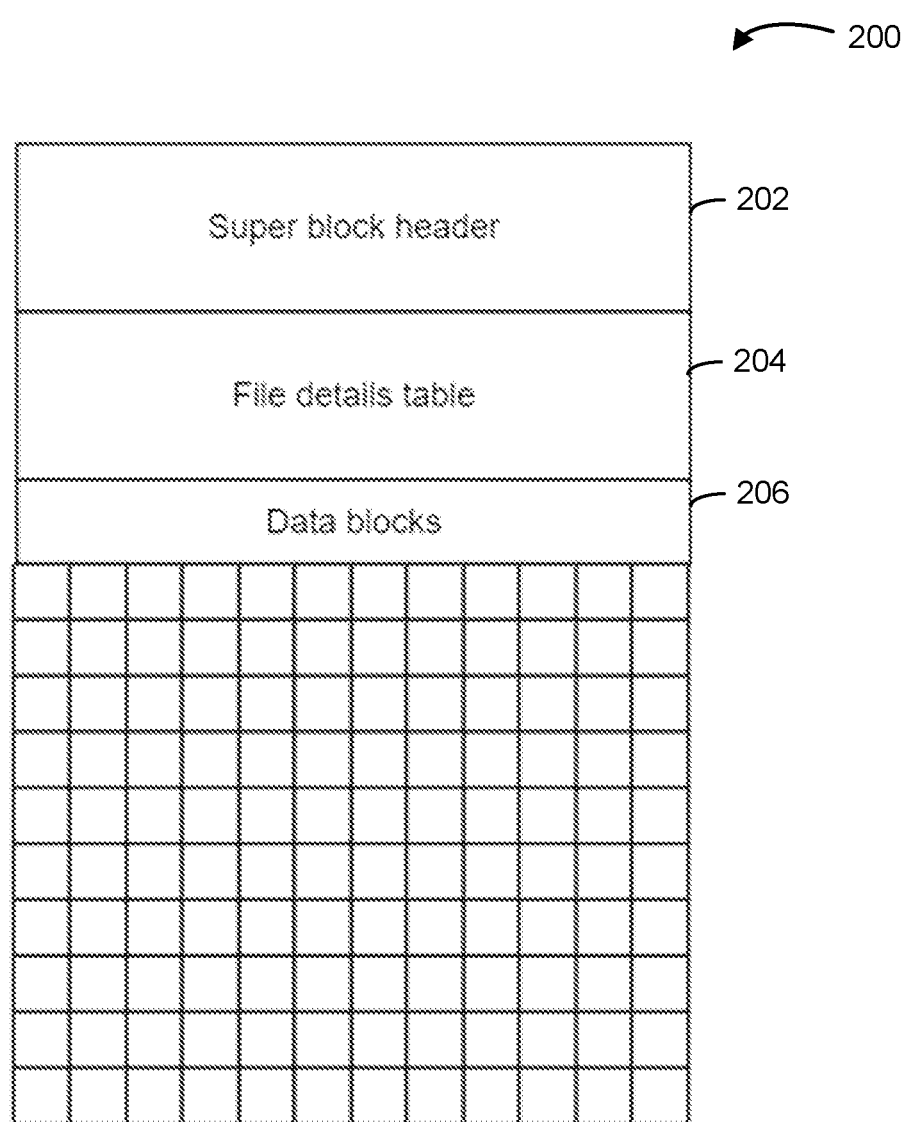
FIG. 2 is an illustration of a file system disk layout, in accordance with an implementation.

FIG. 2 is an illustration of a file system disk layout 200, in accordance with an implementation. The layout 200 can include a super block header 202, a file details table 204, and data blocks 206. The super block header 202 can include an identification indexing the location of any blocks that are stored in memory of a data processing system (e.g., the storage platform 110, as described with reference to FIG. 1). The file details table 204 can include a list of the data blocks and information regarding the files (e.g., records identifying individual data blocks) for which data is stored in the data blocks. The data blocks 206 can be data blocks (e.g., the data blocks 128) in which data is stored using the systems and the methods described herein.

Figure 3:
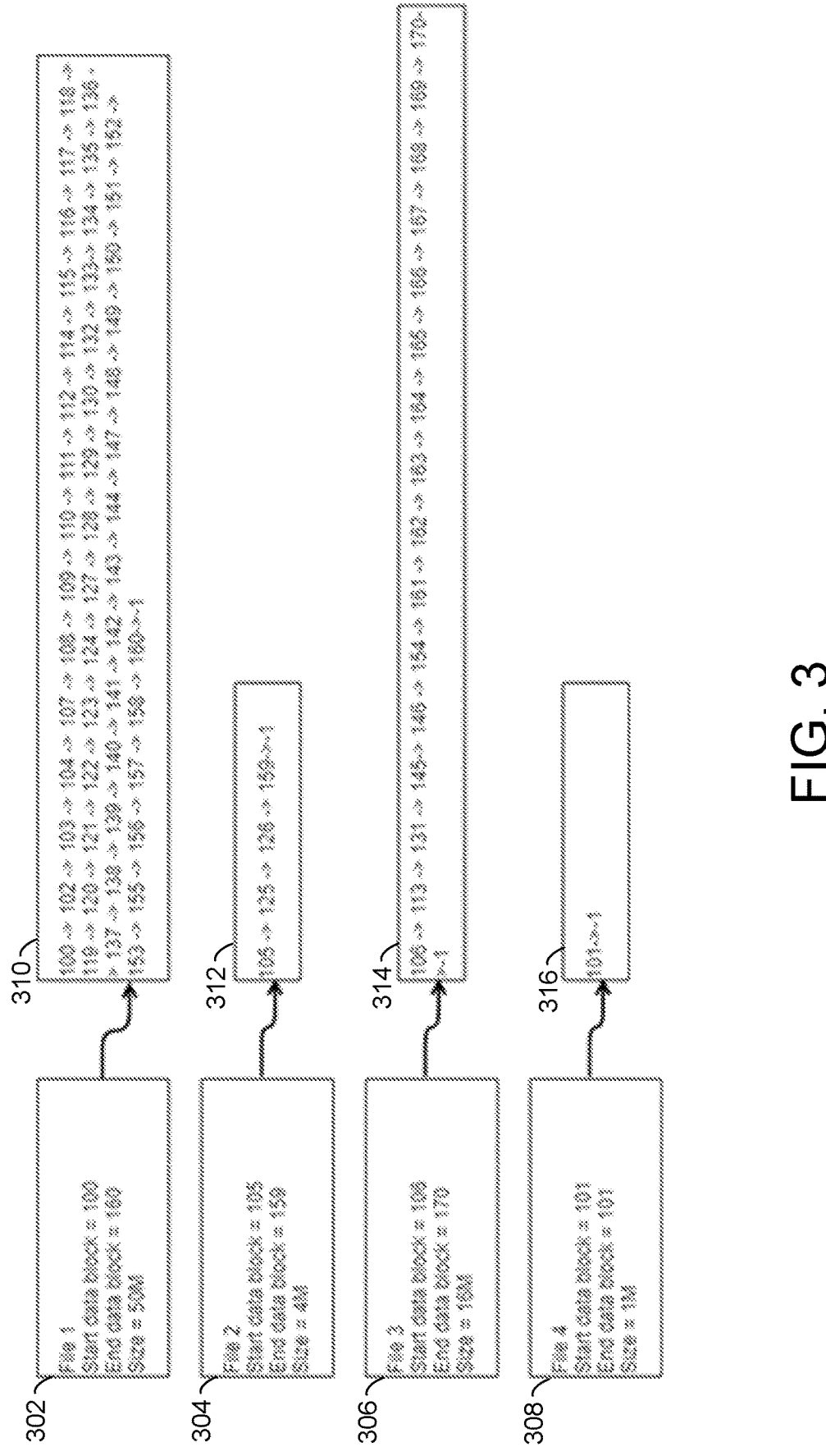
FIG. 3 illustrates data structures of files stored in subsets of data blocks, in accordance with an implementation.

FIG. 3 illustrates data structures (e.g., records) of data of files stored in subsets of data blocks, in accordance with an implementation. FIG. 3 includes data structures 302-308. The data structures 302-308 can correspond to different files for which data is stored in data blocks as described herein. The respective files may correspond to data of the same continuous stream of data or data of different continuous streams of data, as described herein. The data structures 302-308 may be stored in memory of a data processing system (e.g., the storage platform 110, shown and described with reference to FIG. 1). The data in the data structures 302-308 can indicate, for each of the files, the data block (e.g., the index value of the data block) stored in memory of the data processing system that contains the initially stored data of the file and the data block that stores the last data that was stored for the file. The data can also include a size or an amount of memory that is stored for each of the files. The data can include identifications of the respective files. The data can include timestamps indicating the times in which data began being stored for the respective files and the timestamps indicating the times in which data stopped being stored for the respective files. Such timestamps may be useful, for example, to respond to requests. The data processing system can receive a request for data containing a timestamp. The data processing system can compare the timestamp in the data structure to identify a file for a time interval containing the time stamp. The data processing system can query the data blocks of the file to retrieve data of the timestamp (e.g., data of the file or data of the file within a range or interval of the timestamp).

The data in the data structures 302-308 can include identifications of data blocks in which data of the files are stored. For example, data for the file represented by the data structure 302 can be stored in the data blocks of a list 310, data for the file represented by the data structure 304 can be stored in the data blocks of a list 312, data for the file represented by the data structure 306 can be stored in the data blocks of a list 314, and data for the file represented by the data structure 308 can be stored in the data blocks of a list 316. The lists 310-316 may operate as pointers that the data processing system can use to retrieve data for specific files, such as in response to requests.

Figure 4:
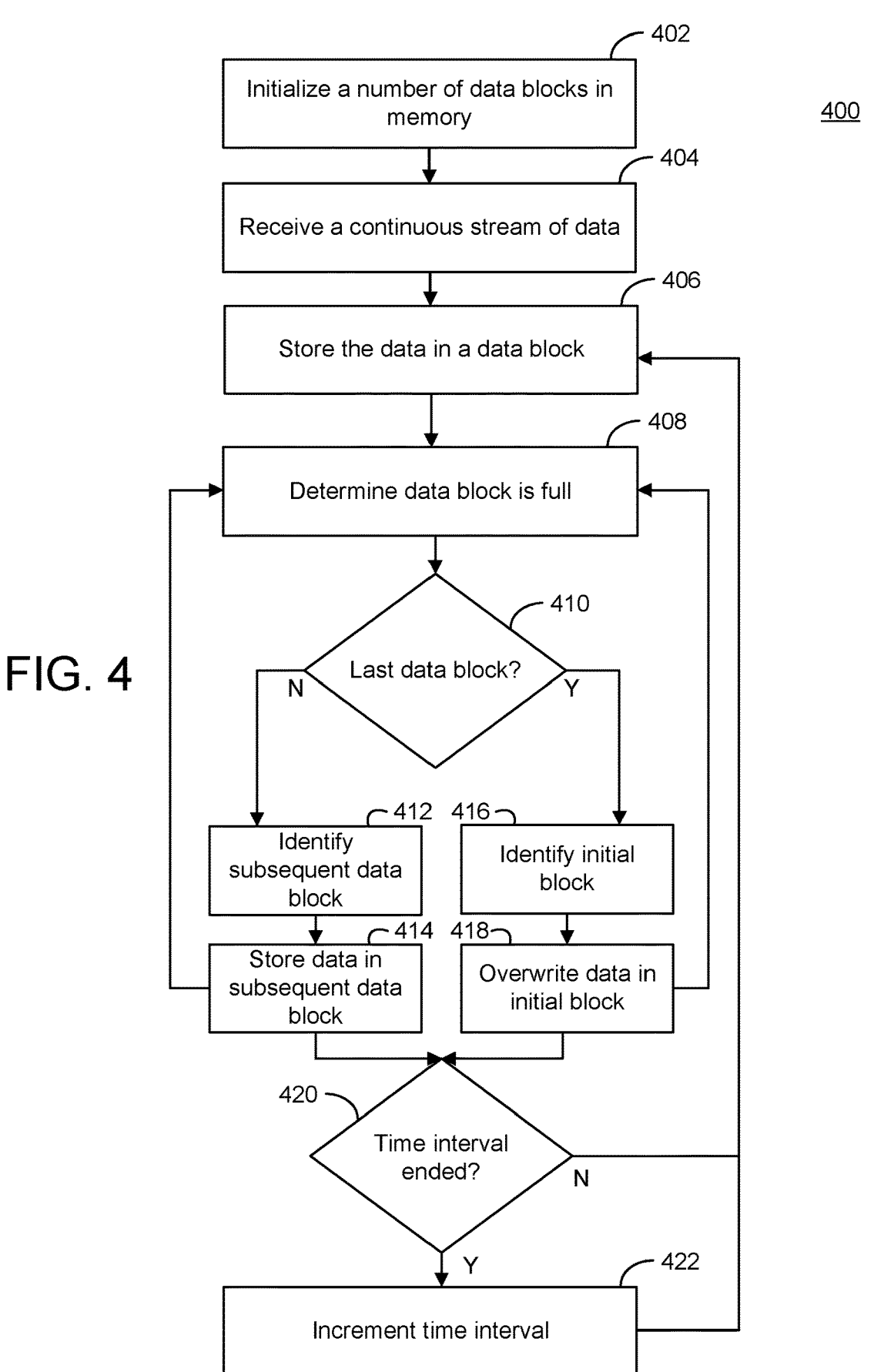
FIG. 4 is an illustration of a method for storing a continuous stream of data in real time, in accordance with an implementation.

FIG. 4 is an illustration of a method 400 for storing data in real time, in accordance with an implementation. The method 400 can be performed by a data processing system (e.g., a client device, the storage platform 110, shown and described with reference to FIG. 1, a server system, etc.). The method 400 may include more or fewer operations and the operations may be performed in any order. Performance of the method 400 may enable the data processing system to store data from one or more continuous streams of data in real time while conserving memory resources and ensuring new and/or relevant data is available for efficient and fast retrieval.

At operation 402, the data processing system initializes (e.g., stores) a programmable (e.g., adjustable or dynamic) number (e.g., a set or plurality) of data blocks in memory. The programmable number of data blocks can include any number of data blocks. The number of data blocks can be programmable because a user can input (e.g., by accessing the data processing system through a client device) a number of data blocks to use during configuration of the data blocks. In some embodiments, data blocks can be downloaded into memory of the data processing system (e.g., more of the memory of the data processing system can be allocated to be one or more data blocks or an external disk or hard drive can be connected with the data processing system to provide further memory for data block allocation). Adding further data blocks can improve the data storage and processing capabilities of the data processing system. The data processing system may store the data blocks in on-disk storage, for example.

At operation 404, the data processing system receives a continuous stream of data. The data processing system may receive the continuous stream of data over time. The data processing system can receive the continuous stream of data from a data source. The continuous stream of data can be, for example, a stream of data packets of one or more communication sessions performed over a network, video data from a video recorder (e.g., a CCTV video recorder), emails from an email server, Domain Name System logs from a Domain Name System server, or any other type of data that can be continuously transmitted over time.

At operation 406, the data processing system stores data from the continuous stream of data in a data block (e.g., a first data block). The data processing system may store the data from the continuous stream of data in the data block as the data processing system receives the continuous stream of data.

The data processing system can store the data from the continuous stream of data in the data block as part of a file. For example, the data processing system can store the data from the continuous stream of data for a first time interval (e.g., a predetermined first time interval). Data stored during the first time interval may be data of a first file. The data processing system can store an identification of the data block in a record of a data structure that corresponds to the first file responsive to storing the data during the first time interval.

At operation 408, the data processing system determines the data block is full. The data processing system can determine the data block is full responsive to determining the memory that is used by data stored in the data block reached a configured limit or capacity of the data block.

At operation 410, the data processing system determines whether the data block is the last data block of the data blocks (e.g., a sequence of data blocks) initialized or stored on disk of the data processing system. The data processing system can determine whether the data block is the last data block based on whether the data block is the last data block of the sequence of data blocks.

Responsive to determining the data block is not the last data block, at operation 412, the data processing system identifies a subsequent data block of the stored data blocks. The data processing system can identify the subsequent data block as the next data block after the initial data block in the sequence of data blocks. Responsive to identifying the subsequent data block, at operation 414, the data processing system can begin storing data from the continuous stream of data in the subsequent data block. In storing data in the subsequent data block, the data processing system can store an identification of the data block in the record for the file for which the data is being stored. The data processing system can store data in the subsequent data block until determining, at operation 408, that the subsequent data block is full, at which point the data processing system can repeat the operation 410.

Responsive to determining at operation 410 that a full data block is the last data block of the data blocks stored in memory, at operation 416, the data processing system identifies an initial data block of the data blocks stored in memory. Data may already be stored in the initial data block, such as from the continuous stream of data or another stream of data. The data may correspond to the same file or a different file.

At operation 418, the data processing system overwrites the data in the initial data block. The data processing system may overwrite the data in the initial data block with newly received data from the continuous stream of data. In cases in which the data processing system is overwriting the data in the data block with data for a different file, the data processing system may remove the identification of the data block being overwritten from a record of a file storing the identification and write the identification of the data block in the record for the new file. The data processing system may otherwise write the identification of the initial data block in the record for the new file. The data processing system may overwrite the data in the initial data block instead of modifying or deleting the initially stored data because the data in the data blocks may be unmodifiable. The data processing system can overwrite the data in the initial data block until determining, at operation 408, that the initial data block is full (e.g., overwriting data has been written into the initial data block to the capacity or limit of the initial data block), at which point the data processing system can repeat the operation 410 but overwriting previously stored data in the data blocks in which the data processing system stores data, as applicable. The data processing system may repeat operations 408-418 over time as the data processing system receives the continuous stream of data.

At operation 420, the data processing system determines whether a time interval ends. The time interval may be the time interval for which the data processing system is currently storing data. The data processing system can perform the operation 420 throughout the time interval (e.g., while performing the operations 408-418). The data processing system can determine whether the time interval ends by identifying using a clock maintained by the data processing system.

Responsive to determining the time interval has ended, at operation 422, the data processing system can increment the time interval for which the data processing system is storing data. The incremented time interval can correspond to a different file or a new file. The data processing system can increment the time interval by returning to the operation 406 and storing identifications of data blocks in which data is being stored in a different record that corresponds to the new file for the next time interval. The data processing system may later use the identifications of the data blocks to retrieve data for specific files or time intervals from the data blocks.

Figure 5A:
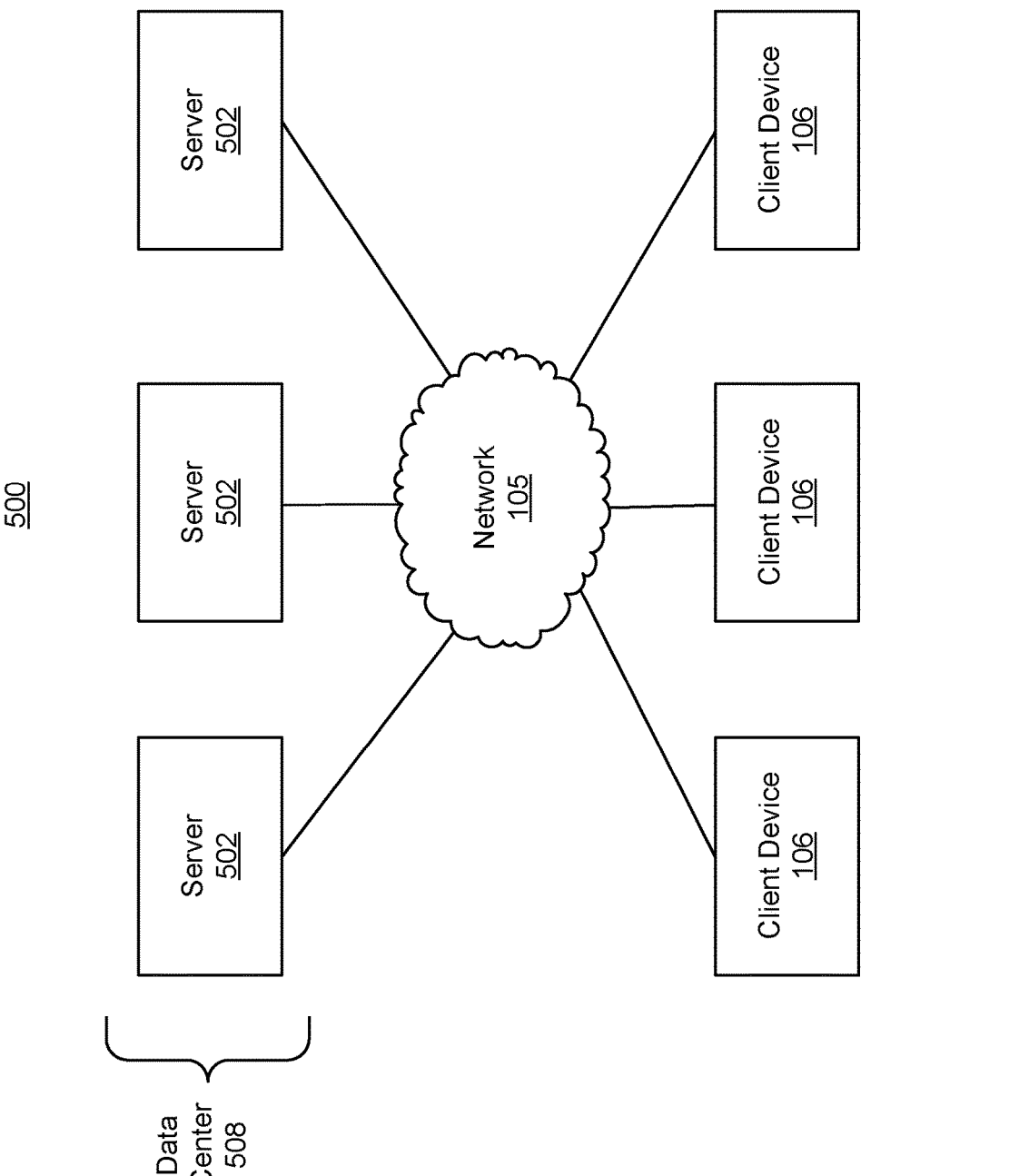
FIG. 5A is a block diagram depicting an implementation of a network environment including a client device in communication with a server device.

FIG. 5A depicts an example network environment that can be used in connection with the methods and systems described herein. In brief overview, the network environment 500 includes one or more client devices 106 (also generally referred to as clients, client node, client machines, client computers, client computing devices, endpoints, or endpoint nodes) in communication with one or more servers 502 (also generally referred to as servers, nodes, or remote machine) via one or more networks 105. In some embodiments, a client device 106 has the capacity to function as both a client node seeking access to resources provided by a server and as a server providing access to hosted resources for other client devices 106.

Although FIG. 5A shows a network 105 between the client devices 106 and the servers 502, the client devices 106 and the servers 502 can be on the same network 105. In embodiments, there are multiple networks 105 between the client devices 106 and the servers 502. The network 105 can include multiple networks such as a private network and a public network. The network 105 can include multiple private networks.

The network 105 can be connected via wired or wireless links. Wired links can include Digital Subscriber Line (DSL), coaxial cable lines, or optical fiber lines. The wireless links can include BLUETOOTH, Wi-Fi, Worldwide Interoperability for Microwave Access (WiMAX), an infrared channel or satellite band. The wireless links can also include any cellular network standards used to communicate among mobile devices, including standards that qualify as 1G, 2G, 3G, 4G, 5G or other standards. The network standards can qualify as one or more generation of mobile telecommunication standards by fulfilling a specification or standards such as the specifications maintained by International Telecommunication Union. Examples of cellular network standards include AMPS, GSM, GPRS, UMTS, LTE, LTE Advanced, Mobile WiMAX, and WiMAX-Advanced. Cellular network standards can use various channel access methods (e.g., FDMA, TDMA, CDMA, or SDMA). In some embodiments, different types of data can be transmitted via different links and standards. In other embodiments, the same types of data can be transmitted via different links and standards.

The network 105 can be any type and/or form of network. The geographical scope of the network 105 can vary widely and the network 105 can be a body area network (BAN), a personal area network (PAN), a local-area network (LAN) (e.g., Intranet, a metropolitan area network (MAN), a wide area network (WAN), or the Internet). The topology of the network 105 can be of any form and can include, e.g., any of the following: point-to-point, bus, star, ring, mesh, or tree. The network 105 can be an overlay network which is virtual and sits on top of one or more layers of other networks 105. The network 105 can be of any such network topology as known to those ordinarily skilled in the art capable of supporting the operations described herein. The network 105 can utilize different techniques and layers or stacks of protocols, including, e.g., the Ethernet protocol or the internet protocol suite (TCP/IP). The TCP/IP internet protocol suite can include application layer, transport layer, internet layer (including, e.g., IPv6), or the link layer. The network 105 can be a type of a broadcast network, a telecommunications network, a data communication network, or a computer network.

The network environment 500 can include multiple, logically grouped servers 502. The logical group of servers can be referred to as a data center 508 (or server farm or machine farm). In embodiments, the servers 502 can be geographically dispersed. The data center 508 can be administered as a single entity or different entities. The data center 508 can include multiple data centers 508 that can be geographically dispersed. The servers 502 within each data center 508 can be homogeneous or heterogeneous (e.g., one or more of the servers 502 or machines 502 can operate according to one type of operating system platform (e.g., WINDOWS NT, manufactured by Microsoft Corp. of Redmond, Washington), while one or more of the other servers 502 can operate on according to another type of operating system platform (e.g., Unix, Linux, or Mac OS X)). The servers 502 of each data center 508 do not need to be physically proximate to another server 502 in the same machine farm 508. Thus, the group of servers 502 logically grouped as a data center 508 can be interconnected using a network. Management of the data center 508 can be de-centralized. For example, one or more servers 502 can comprise components, subsystems and modules to support one or more management services for the data center 508.

Server 502 can be a file server, application server, web server, proxy server, appliance, network appliance, gateway, gateway server, virtualization server, deployment server, SSL VPN server, or firewall. In embodiments, the server 502 can be referred to as a remote machine or a node. Multiple nodes can be in the path between any two communicating servers.

Figure 5B:
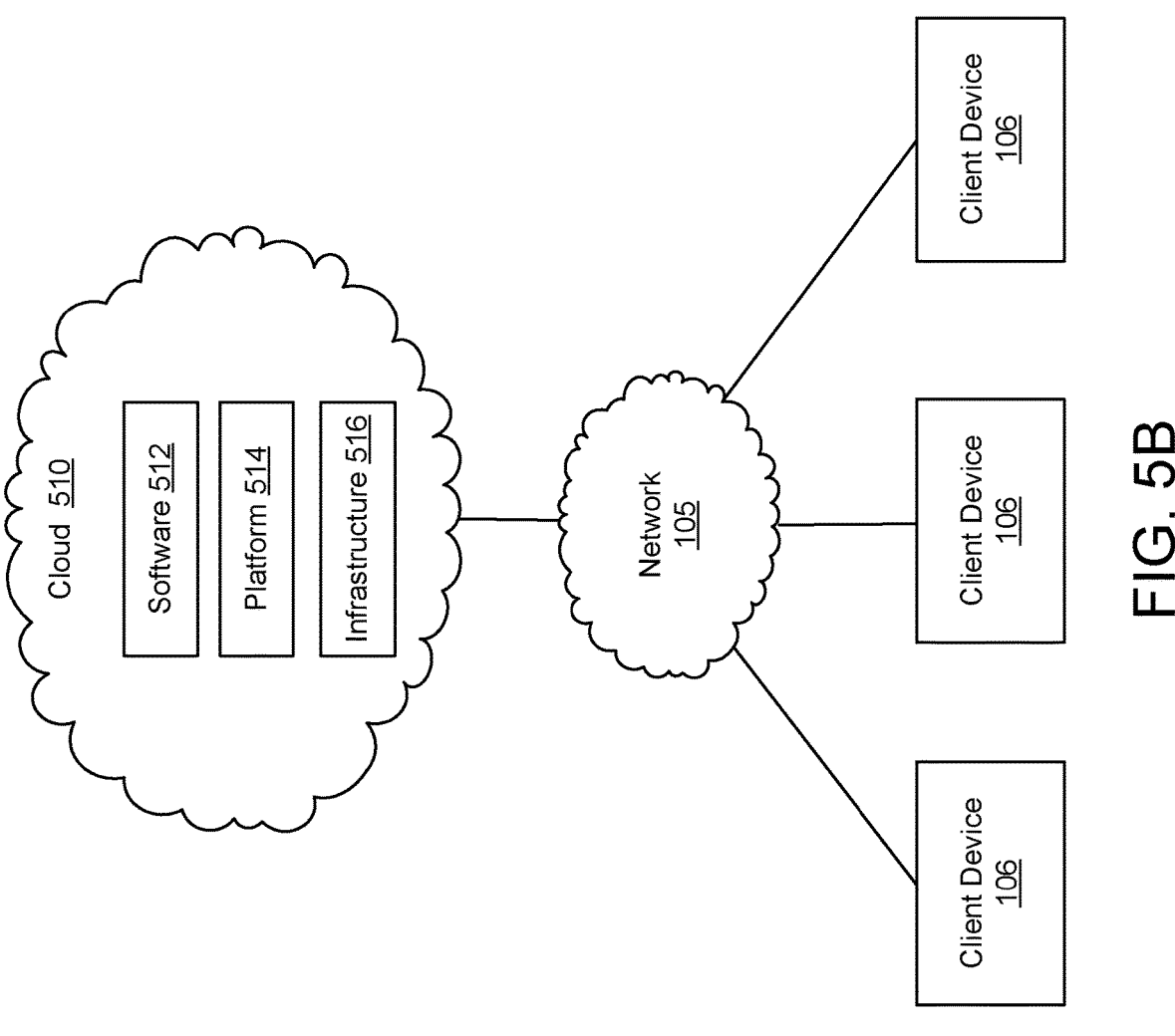
FIG. 5B is a block diagram depicting a cloud computing environment including a client device in communication with cloud service providers.

FIG. 5B illustrates an example cloud computing environment. A cloud computing environment 501 can provide the client device 106 with one or more resources provided by a network environment. The cloud computing environment 501 can include one or more client devices 106, in communication with the cloud 510 over one or more networks 105. Client devices 106 can include, e.g., thick clients, thin clients, and zero clients. A thick client can provide at least some functionality even when disconnected from the cloud 510 or servers 502. A thin client or a zero client can depend on the connection to the cloud 510 or server 502 to provide functionality. A zero client can depend on the cloud 510 or other networks 105 or servers 502 to retrieve operating system data for the client device. The cloud 510 can include back end platforms, e.g., servers 502, storage, and/or server farms or data centers.

The cloud 510 can be public, private, or hybrid. Public clouds can include public servers 502 that are maintained by third parties to the client devices 106 or the owners of the clients. The servers 502 can be located off-site in remote geographical locations as disclosed above or otherwise. Public clouds can be connected to the servers 502 over a public network. Private clouds can include private servers 502 that are physically maintained by client devices 106 or owners of clients. Private clouds can be connected to the servers 502 over a private network 105. Hybrid clouds 508 can include both the private and public networks 105 and servers 502.

The cloud 510 can also include a cloud-based delivery, (e.g., Software as a Service (Saas) 512, Platform as a Service (PaaS) 514, and the Infrastructure as a Service (IaaS) 516). IaaS can refer to a user renting the use of infrastructure resources that are needed during a specified time period. IaaS providers can offer storage, networking, servers or virtualization resources from large pools, allowing the users to quickly scale up by accessing more resources as needed. PaaS providers can offer functionality provided by IaaS, including, e.g., storage, networking, servers or virtualization, as well as additional resources such as, e.g., the operating system, middleware, or runtime resources. SaaS providers can offer the resources that PaaS provides, including storage, networking, servers, virtualization, operating system, middleware, or runtime resources. In some embodiments, SaaS providers can offer additional resources including, e.g., data and application resources.

Client devices 106 can access IaaS resources, SaaS resources, or PaaS resources. In embodiments, access to IaaS, PaaS, or SaaS resources can be authenticated. For example, a server or authentication server can authenticate a user via security certificates, HTTPS, or API keys. API keys can include various encryption standards such as, e.g., Advanced Encryption Standard (AES). Data resources can be sent over Transport Layer Security (TLS) or Secure Sockets Layer (SSL).

The client device 106 and server 502 can be deployed as and/or executed on any type and form of computing device (e.g., a computer, network device or appliance capable of communicating on any type and form of network and performing the operations described herein).

Figure 5C:
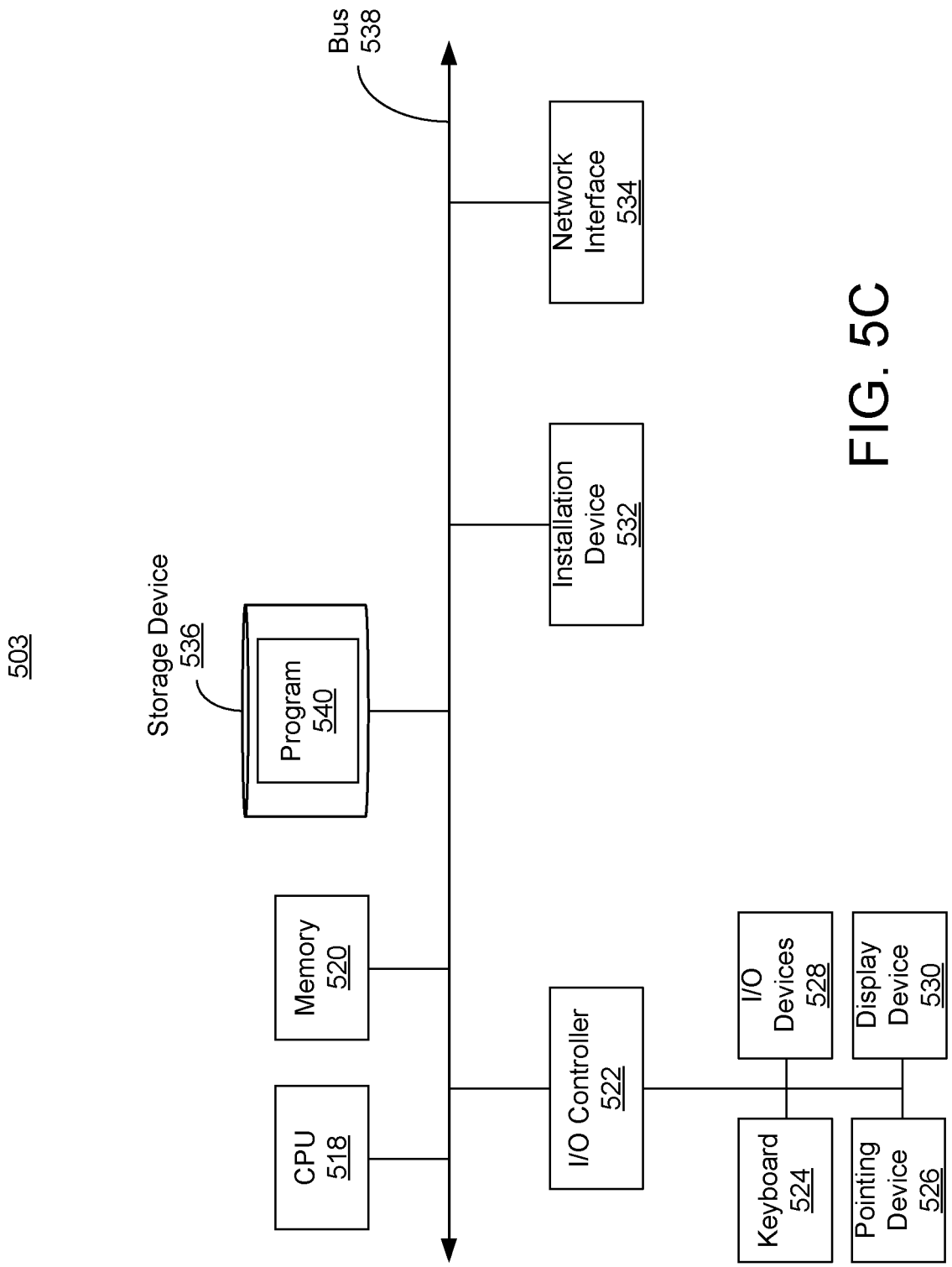
FIG. 5C is a block diagram depicting an implementation of a computing device that can be used in connection with the systems depicted in FIGS. 1, 5A, and 5B and the method depicted in FIG. 4.

FIG. 5C depicts block diagrams of a computing device 503 useful for practicing an embodiment of the client device 106 or a server 502. As shown in FIG. 5C, each computing device 503 can include a central processing unit 518, and a main memory unit 520. As shown in FIG. 5C, a computing device 503 can include one or more of a storage device 536, an installation device 532, a network interface 534, an I/O controller 522, a display device 530, a keyboard 524 or a pointing device 526, (e.g., a mouse). The storage device 536 can include, without limitation, a program 540, such as an operating system, software, or software associated with system 100.

The central processing unit 518 is any logic circuitry that responds to and processes instructions fetched from the main memory unit 520. The central processing unit 518 can be provided by a microprocessor unit, e.g.: those manufactured by Intel Corporation of Mountain View, California. The computing device 503 can be based on any of these processors, or any other processor capable of operating as described herein. The central processing unit 518 can utilize instruction level parallelism, thread level parallelism, different levels of cache, and multi-core processors. A multi-core processor can include two or more processing units on a single computing component.

Main memory unit 520 can include one or more memory chips capable of storing data and allowing any storage location to be directly accessed by the microprocessor 518. Main memory unit 520 can be volatile and faster than storage 536 memory. Main memory units 520 can be Dynamic random access memory (DRAM) or any variants, including static random access memory (SRAM). The memory 520 or the storage 536 can be non-volatile; e.g., non-volatile read access memory (NVRAM). The memory 520 can be based on any type of memory chip, or any other available memory chips. In the example depicted in FIG. 5C, the processor 518 can communicate with memory 520 via a system bus 538.

A wide variety of I/O devices 528 can be present in the computing device 503. Input devices 528 can include keyboards, mice, trackpads, trackballs, touchpads, touch mice, multi-touch touchpads and touch mice, microphones, multi-array microphones, drawing tablets, cameras, or other sensors. Output devices can include video displays, graphical displays, speakers, headphones, or printers.

I/O devices 528 can have both input and output capabilities, including, e.g., haptic feedback devices, touchscreen displays, or multi-touch displays. Touchscreen, multi-touch displays, touchpads, touch mice, or other touch sensing devices can use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices can allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, can have larger surfaces, such as on a table-top or on a wall, and can also interact with other electronic devices. Some I/O devices 528, display devices 530 or group of devices can be augmented reality devices. The I/O devices can be controlled by an I/O controller 522 as shown in FIG. 5C. The I/O controller 522 can control one or more I/O devices, such as, e.g., a keyboard 524 and a pointing device 526, e.g., a mouse or optical pen. Furthermore, an I/O device can also provide storage and/or an installation device 532 for the computing device 503. In embodiments, the computing device 503 can provide USB connections (not shown) to receive handheld USB storage devices. In embodiments, an I/O device 528 can be a bridge between the system bus 538 and an external communication bus (e.g., a USB bus, a SCSI bus, a FireWire bus, an Ethernet bus, a Gigabit Ethernet bus, a Fibre Channel bus, or a Thunderbolt bus).

In embodiments, display devices 530 can be connected to I/O controller 522. Display devices can include, e.g., liquid crystal displays (LCD), electronic papers (e-ink) displays, flexile displays, light emitting diode displays (LED), or other types of displays. In some embodiments, display devices 530 or the corresponding I/O controllers 522 can be controlled through or have hardware support for OPENGL or DIRECTX API or other graphics libraries. Any of the I/O devices 528 and/or the I/O controller 522 can include any type and/or form of suitable hardware, software, or combination of hardware and software to support, enable or provide for the connection and use of one or more display devices 530 by the computing device 503. For example, the computing device 503 can include any type and/or form of video adapter, video card, driver, and/or library to interface, communicate, connect or otherwise use the display devices 530. In embodiments, a video adapter can include multiple connectors to interface to multiple display devices 530.

The computing device 503 can include a storage device 536 (e.g., one or more hard disk drives or redundant arrays of independent disks) for storing an operating system or other related software, and for storing application software programs 540 such as any program related to the systems, methods, components, modules, elements, or functions depicted in FIG. 1, 2, 3, or 4. Examples of storage device 536 include, e.g., hard disk drive (HDD); optical drive including CD drive, DVD drive, or BLU-RAY drive; solid-state drive (SSD); USB flash drive; or any other device suitable for storing data. Storage devices 536 can include multiple volatile and non-volatile memories, including, e.g., solid state hybrid drives that combine hard disks with solid state cache. Storage devices 536 can be non-volatile, mutable, or read-only. Storage devices 536 can be internal and connect to the computing device 503 via a bus 538. Storage device 536 can be external and connect to the computing device 503 via an I/O device 530 that provides an external bus. Storage device 536 can connect to the computing device 503 via the network interface 534 over a network 105. Some client devices 106 may not require a non-volatile storage device 536 and can be thin clients or zero client devices 106. Some storage devices 536 can be used as an installation device 532 and can be suitable for installing software and programs. The computing device 503 can include a network interface 534 to interface to the network 105 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). The computing device 503 can communicate with other computing devices 503 via any type and/or form of gateway or tunneling protocol e.g. Secure Socket Layer (SSL) or Transport Layer Security (TLS), QUIC protocol, or the Citrix Gateway Protocol manufactured by Citrix Systems, Inc. of Ft. Lauderdale, Florida. The network interface 534 can include a built-in network adapter, network interface card, PCMCIA network card, EXPRESSCARD network card, card bus network adapter, wireless network adapter, USB network adapter, modem or any other device suitable for interfacing the computing device 503 to any type of network capable of communication and performing the operations described herein.

A computing device 503 of the sort depicted in FIG. 5C can operate under the control of an operating system, which controls scheduling of tasks and access to system resources. The computing device 503 can be running any operating system configured for any type of computing device, including, for example, a desktop operating system, a mobile device operating system, a tablet operating system, or a smartphone operating system.

The computing device 503 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computing device 503 has sufficient processor power and memory capacity to perform the operations described herein. In some embodiments, the computing device 503 can have different processors, operating systems, and input devices consistent with the device.

In embodiments, the status of one or more machines 106, 502 in the network 105 can be monitored as part of network management. In embodiments, the status of a machine can include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information can be identified by a plurality of metrics, and the plurality of metrics can be applied at least in part towards decisions in load distribution, network traffic management, and network failure recovery as well as any aspects of operations of the present solution described herein.

The processes, systems and methods described herein can be implemented by the computing device 503 in response to the CPU 518 executing an arrangement of instructions contained in main memory 520. Such instructions can be read into main memory 520 from another computer-readable medium, such as the storage device 536. Execution of the arrangement of instructions contained in main memory 520 causes the computing device 503 to perform the illustrative processes described herein. One or more processors in a multi-processing arrangement may also be employed to execute the instructions contained in main memory 520. Hard-wired circuitry can be used in place of or in combination with software instructions together with the systems and methods described herein. Systems and methods described herein are not limited to any specific combination of hardware circuitry and software.

Although an example computing system has been described in FIG. 5, the subject matter including the operations described in this specification can be implemented in other types of digital electronic circuitry, or in computer software, firmware, or hardware, including the structures disclosed in this specification and their structural equivalents, or in combinations of one or more of them.

At least one aspect of this technical solution is directed to a method. The method may include storing, by one or more processors of a computing device, a set of data blocks in disk storage of the computing device; receiving, by one or more processors, a continuous stream of data from a data source; storing, by the one or more processors and while receiving the continuous stream of data, first data from the continuous stream of data in a first subset of the set of data blocks for a first time interval; responsive to detecting an end of the first time interval, storing, by the one or more processors and while receiving the continuous stream of data, second data from the continuous stream of data in a second subset of the set of data blocks for a second time interval; determining, by the one or more processors during the second time interval, each of the set of data blocks is filled with data; and responsive to the determining that each of the set of data blocks is filled with data, automatically overwriting, by the one or more processors, a third subset of data blocks of the set of data blocks with third data collected from the continuous stream of data subsequent to the second data during the second time interval.

At least one aspect of this technical solution is directed to a system. The system may include one or more processors, coupled to memory and disk storage. The one or more processors may store a set of data blocks in a location in the memory and the disk storage; receive a continuous stream of data from a data source; store, while receiving the continuous stream of data, first data from the continuous stream of data in a first subset of the set of data blocks for a first time interval; responsive to detecting an end of the first time interval, store, while receiving the continuous stream of data, second data from the continuous stream of data in a second subset of the set of data blocks for a second time interval; determine, during the second time interval, each of the set of data blocks is filled with data; and responsive to the determining that each of the set of data blocks is filled with data, overwrite a third subset of data blocks of the set of data blocks with third data collected from the continuous stream of data during the second time interval.

At least one aspect of this technical solution is directed to non-transitory computer-readable media. The non-transitory computer-readable media may comprise instructions that, when executed by one or more processors, cause the one or more processors to: store a set of data blocks in disk storage; receive a continuous stream of data from a data source; store, while receiving the continuous stream of data, first data from the continuous stream of data in a first subset of the set of data blocks for a first time interval; responsive to detecting an end of the first time interval, store, while receiving the continuous stream of data, second data from the continuous stream of data in a second subset of the set of data blocks for a second time interval; determine, during the second time interval, each of the set of data blocks is filled with data; and responsive to the determining that each of the set of data blocks is filled with data, overwrite a third subset of data blocks of the set of data blocks with third data collected from the continuous stream of data during the second time interval.

The foregoing detailed description includes illustrative examples of various aspects and implementations and provides an overview or framework for understanding the nature and character of the claimed aspects and implementations. The drawings provide illustration and a further understanding of the various aspects and implementations and are incorporated in and constitute a part of this specification.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "computing device" or "component" encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the storage platform 110) to perform actions by operating on input data and generating an output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks. The processor and the memory can be supplemented by, or incorporated in, special purpose logic circuitry.

While operations are depicted in the drawings in a particular order, such operations are not required to be performed in the particular order shown or in sequential order, and all illustrated operations are not required to be performed. Actions described herein can be performed in a different order. The separation of various system components does not require separation in all implementations, and the described program components can be included in a single hardware or software product.

The phraseology and terminology used herein is for the purpose of description and should not be regarded as limiting. Any references to implementations or elements or acts of the systems and methods herein referred to in the singular may also embrace implementations including a plurality of these elements, and any references in plural to any implementation or element or act herein may also embrace implementations including only a single element. Any implementation disclosed herein may be combined with any other implementation or embodiment.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A method comprising:

storing, by one or more processors of a computing device, a set of data blocks in disk storage of the computing device;

receiving, by one or more processors, a continuous stream of data from a data source;

storing, by the one or more processors and while receiving the continuous stream of data, first data from the continuous stream of data in a first subset of the set of data blocks for a first file, the first file being defined by a predetermined first time interval having a defined start and a defined end based on time interval boundaries;

responsive to detecting an end of the first time interval, closing the first file to prevent further data from being written to the first file, and storing, by the one or more processors and while receiving the continuous stream of data, second data from the continuous stream of data in a second subset of the set of data blocks for a second file, the second file being defined by a predetermined second time interval having a defined start and a defined end based on time interval boundaries;

determining, by the one or more processors during the predetermined second time interval, each of the set of data blocks is filled with data; and determining, by the one or more processors, that a time difference between a current time and the predetermined first time interval exceeds a retention threshold;

responsive to the determining that each of the set of data blocks is filled with data and that the time difference exceeds the retention threshold, automatically overwriting, by the one or more processors, the first subset of data blocks comprising the first file in its entirety with third data collected from the continuous stream of data subsequent to the second data during the predetermined second time interval;

wherein the one or more processors store in a data structure in memory an identification of each data block in the first and second subsets with an identification of the corresponding first or second file, wherein each identification permanently associates each data block with its corresponding file and is maintained without reassignment unless the data block is overwritten.

2. The method of claim 1, further comprising:

storing, by the one or more processors in a data structure in memory of the computing device, an identification of each of the first subset of data blocks with a first identification of a first file.

3. The method of claim 2, further comprising:

storing, by the one or more processors in the data structure in the memory of the computing device, an identification of each of the second subset of data blocks and the third subset of data blocks with a second identification of a second file.

4. The method of claim 2, further comprising:

receiving, by the one or more processors, a request comprising the identification of the first file; and retrieving, by the one or more processors, the first data from the first subset of the set of data blocks based on the first identification of the first file in the request matching the first identification of the first file in each of the first subset of data blocks.

5. The method of claim 1, wherein storing the first data in the first subset of data blocks comprising storing, by the one or more processors, the first data in a first plurality of data blocks of the set of data blocks.

6. The method of claim 1, further comprising:

receiving, by the one or more processors during the predetermined first time interval, a second continuous stream of data from a second data source;

storing, by the one or more processors and while receiving the second continuous stream of data, fourth data from the second continuous stream of data in a fourth subset of the set of data blocks for the predetermined first time interval; and responsive to the detecting the end of the predetermined first time interval, storing, by the one or more processors and while receiving the second continuous stream of data, fifth data from the second continuous stream of data in a fifth subset of the set of data blocks for the predetermined second time interval.

7. The method of claim 1, wherein determining that each of the set of data blocks is filled with data comprises determining, by the one or more processors, that a maximum file limit has been reached.

8. The method of claim 1, wherein data within the set of data bocks is unmodifiable.

9. The method of claim 1, wherein storing the first data in the first subset of the set of data blocks comprises:

storing, by the one or more processors, a first set of data of the first data in a first data block of the first subset of data blocks;

determining, by the one or more processors, the first data block is full; and responsive to determining the first data block is full, storing, by the one or more processors, a second set of data of the first data in a second data block of the first subset of the set of data blocks.

10. The method of claim 9, wherein storing the first data in the first subset of the set of data blocks comprises:

identifying, by the one or more processors, the second data block based on an index of the second data block responsive to determining the first data block is full; and storing, by the one or more processors, the second set of data of the first data in the second data block responsive to identifying the second data block based on the index of the second data block.

11. The method of claim 1, wherein receiving the continuous stream of data comprises receiving, by the one or more processors, a stream of data packets transmitted via a communications network.

12. The method of claim 1, wherein receiving the continuous stream of data comprises receiving, by the one or more processors, audiovisual data from a video recorder.

13. The method of claim 1, further comprising:

responsive to detecting a second end of the predetermined second time interval, storing, by the one or more processors and while receiving the continuous stream of data, third data from the continuous stream of data in a fourth subset of the set of data blocks for a predetermined third time interval having a defined start and a defined end based on time interval boundaries;

determining, by the one or more processors, that a time difference between a current time and the predetermined first time interval exceeds a threshold; and responsive to determining that the time difference exceeds the threshold, overwriting, by the one or more processors during the predetermined third time interval, the first data in the first subset of data blocks with the third data from the continuous stream of data.

14. The method of claim 1, wherein storing the set of data blocks in the disk storage of the computing device comprises storing, by the one or more processors, the set of data blocks as data blocks with equal size.

15. A system, comprising:

one or more processors, coupled to memory and disk storage, to:

store a set of data blocks in the disk storage;

receive a continuous stream of data from a data source;

store, while receiving the continuous stream of data, first data from the continuous stream of data in a first subset of the set of data blocks for a first file, the first file being defined by a predetermined first time interval having a defined start and a defined end based on time interval boundaries;

responsive to detecting an end of the first time interval, close the first file to prevent further data from being written to the first file, and store, while receiving the continuous stream of data, second data from the continuous stream of data in a second subset of the set of data blocks for a second file, the second file being defined by a predetermined second time interval having a defined start and a defined end based on time interval boundaries;

determine, during the predetermined second time interval, each of the set of data blocks is filled with data;

determine that a time difference between a current time and the predetermined first time interval exceeds a retention threshold; and responsive to the determining that each of the set of data blocks is filled with data and that the time difference exceeds the retention threshold, overwrite the first subset of data blocks comprising the first file in its entirety with third data collected from the continuous stream of data subsequent to the second data during the predetermined second time interval;

wherein the one or more processors further store in a data structure in the memory an identification of each data block in the first and second subsets with an identification of the corresponding first or second file, wherein each identification permanently associates each data block with its corresponding file and is maintained without reassignment unless the data block is overwritten.

16. The system of claim 15, wherein the one or more processors further:

store, in the memory, an identification of each of the first subset of data blocks with a first identification of a first file.

17. The system of claim 16, wherein the one or more processors further:

store, in the memory, an identification of each of the second subset of data blocks and the third subset of data blocks with a second identification of a second file.

18. The system of claim 16, wherein the one or more processors further:

receive a request comprising the identification of the first file; and retrieve the first data from the first subset of the set of data blocks based on the first identification of the first file in the request matching the first identification of the first file in each of the first subset of data blocks.

19. Non-transitory computer-readable media comprising instructions that, when executed by one or more processors, cause the one or more processors to:

store a set of data blocks in disk storage;

receive a continuous stream of data from a data source;

store, while receiving the continuous stream of data, first data from the continuous stream of data in a first subset of the set of data blocks for a first file, the first file being defined by a predetermined first time interval having a defined start and a defined end based on time interval boundaries;

responsive to detecting an end of the first time interval, close the first file to prevent further data from being written to the first file, and store, while receiving the continuous stream of data, second data from the continuous stream of data in a second subset of the set of data blocks for a second file, the second file being defined by a predetermined second time interval having a defined start and a defined end based on time interval boundaries;

determine, during the predetermined second time interval, each of the set of data blocks is filled with data; and determine that a time difference between a current time and the predetermined first time interval exceeds a retention threshold;

responsive to the determining that each of the set of data blocks is filled with data and that the time difference exceeds the retention threshold, overwrite the first subset of data blocks comprising the first file in its entirety with third data collected from the continuous stream of data subsequent to the second data during the predetermined second time interval;

wherein the instructions further cause the one or more processors to store in a data structure in memory an identification of each data block in the first and second subsets with an identification of the corresponding first or second file, wherein each identification permanently associates each data block with its corresponding file and is maintained without reassignment unless the data block is overwritten.

20. The non-transitory computer-readable media of claim 19, wherein the instructions further cause the one or more processors to:

store, in a data structure in memory, an identification of each of the first subset of data blocks with a first identification of a first file.

* * * * *